Jan. 28, 1969 D. W. ROLLINS 3,424,107
AUDIBLE SIGNAL DEVICE FOR TRAILER HITCHES ON RAILWAY CARS
Filed Feb. 13, 1967

INVENTOR.
DALLAS W. ROLLINS
BY *Samuel J. Snyder*
ATTORNEY

Jan. 28, 1969  D. W. ROLLINS  3,424,107
AUDIBLE SIGNAL DEVICE FOR TRAILER HITCHES ON RAILWAY CARS
Filed Feb. 13, 1967

United States Patent Office 3,424,107
Patented Jan. 28, 1969

1

3,424,107
AUDIBLE SIGNAL DEVICE FOR TRAILER HITCHES ON RAILWAY CARS
Dallas W. Rollins, St. Charles, Mo., assignor to ACF Industries, Incorporated, New York, N.Y., a corporation of New Jersey
Filed Feb. 13, 1967, Ser. No. 615,415
U.S. Cl. 105—368         5 Claims
Int. Cl. B65j 1/22; B60p 7/08

ABSTRACT OF THE DISCLOSURE

An audible signal device indicates the positive locking of a trailer hitch in its erect position on a railway flat car. The audible signal device is operatively connected to latch means in a collapsible leg of the hitch and operable upon movement of the latch means to locked position to emit an audible signal to the tractor operator for indicating a positive locking of the collapsible leg in erect position.

Background of the invention

In the use of tractor operated trailer hitches on railway flat cars, the hitch is erected and collapsed by a tractor. Normally, a separate workman is employed to visually check the hitch when the hitch is erected by the tractor to insure that the trailer is positively secured by the hitch for transit of the trailers on the railway car. In the event a separate workman is not employed, the tractor driver-operator must leave the tractor to determine that the hitch is securely locked in position for transit of the trailer. If the hitch is not securely locked, then the trailer may become disengaged or unsupported during transit with the possibility of the trailer being thrown off or rolling off the railway flat car.

Cross reference to related application

This application is relates to my application Ser. No. 615,611, filed Feb. 13, 1967 disclosing means for producing an audible signal upon latching of the trailer kingpin.

Summary of the invention

The present invention provides an audible signal to the tractor driver when the hitch is securely locked. Thus, a separate workman or the tractor operator does not have to check visually the locking means to determine if the hitch is securely locked before the tractor drives away. The hitch comprises the conventional fifth wheel mounting plate on the upper end of a vertical leg mounted for movement between a collapsed position and an erect position, the mounting plate having kingpin engaging means movable between engaged and disengaged positions relative to the kingpin and actuated into engaged position by contact of the kingpin upon movement of the leg to erect position, means on said vertical leg adapted to be engaged by a hook on a tractor for raising the leg from a collapsed position to erect position, latch means movable into locked position relative to said kingpin engaging means upon movement of said kingpin engaging means to engaged position. The invention of this application provides a bell which is rung by latch means for locking a leg of the hitch, particularly the diagonal leg, in its erect position, upon completion of the locking operation.

The invention is illustrated herein in a hitch structurally similar to those shown in my patent application Ser. No. 561,613, filed June 29, 1966, now abandoned and in Patent No. 3,225,707. These hitches include trailer kingpin latching means and means for latching the diagonal leg in the erect position, as do other tractor operated hitches. The audible signal device of this invention indicates completion of the operation of diagonal leg latching means. As in prior hitches, the locked condition of the latching means can be checked visually, but in addition, a positive signal is emitted at the completion of latching to advise the tractor operator that the hitch is safely locked.

Brief description of the drawing

The invention will be fully understood from the following description and the drawing in which.

Description of the preferred embodiment

Figure 4:
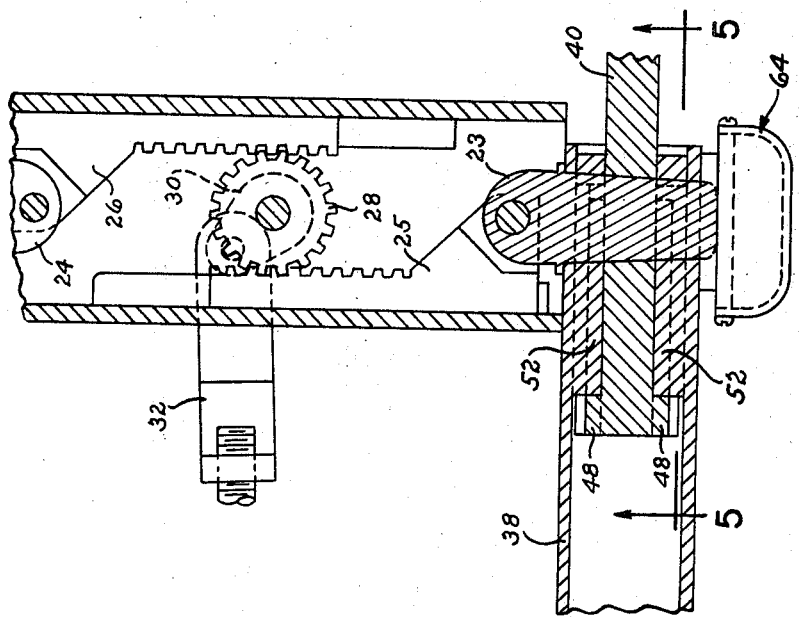
FIG. 4 is a sectional view showing the diagonal leg latching means in locked position.

Referring to the drawing, two flat cars F are coupled to each other and their decks D are bridged by boards B. One car supports a highway trailer T on its deck by means of a trailer hitch 10 engaging the usual kingpin at the front end of the trailer and the other car supports a trailer tractor M, as shown more fully in Patent 3,225,707. The hitch includes a vertical leg or support 12 pivotally mounted on the car at its lower end, a diagonal leg or brace 14 pivotally connected at its upper end to leg 12 and pivotally connected at its lower end to the car. A fifth wheel structure 18 is pivotally mounted on the top of vertical leg 12. The leg 14 consists of upper and lower telescoping sections 19 and 20. When diagonal leg 14 is in its erect extended position, sections 19 and 20 are latched together by a latching mechanism 22 comprising pins 23 and 24 pivotally connected to gear racks 25 and 26 movable inwardly and outwardly by the turning of pinion 28. The latter is adapted to be turned by crank 30 connected at its outer end to rod 32, which is urged by spring 34 to the position shown in FIG. 4, to cause pins 23 and 24 to lock together leg portions 19 and 20. This structure is shown and described in detail in Patent 3,225,707, and is not the essence of the present invention. As shown and fully explained in said patent, when a bumper block 35 on the rear of trailer tractor M impacts pusher bar 36, which is on a lever 37, rod 32, which is pivotally connected to lever 37, is moved downwardly against spring 34 to turn pinion 28 and retract pins 23, 24 to unlatch diagonal leg 14 and permit it to collapse and to allow the hitch to drop, when at the same time it is also unlatched from the trailer kingpin.

Figure 5:
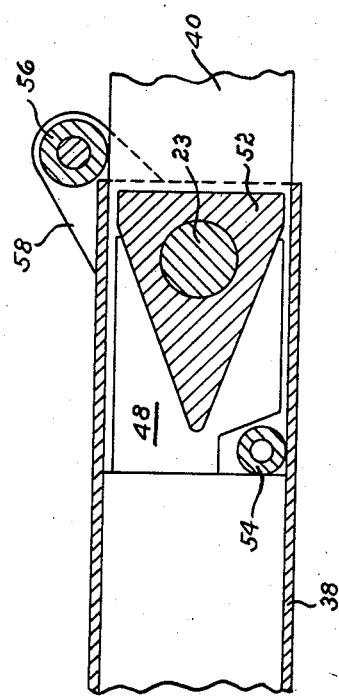
FIG. 5 is a side sectional view taken along line 5—5 of FIG. 4.
Figure 6:
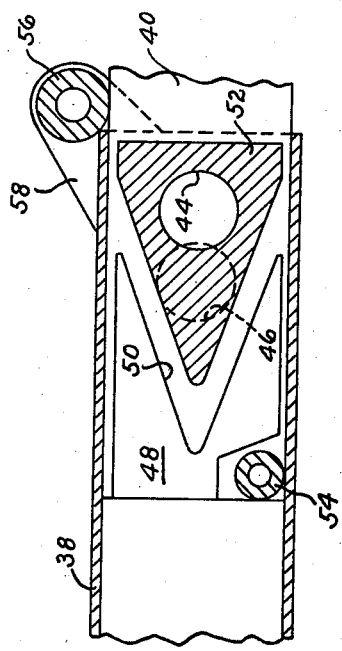
FIG. 6 is a sectional view similar to FIG. 5 but showing the portions of the diagonal leg out of alignment.

The upper section 19 of diagonal leg 14 comprises a pair of box-shaped legs 38 connected by plate 39. The lower section 20 of the diagonal leg includes two side legs 40 each telescoping within one of the box-shaped legs 38 and each having its lower end pivoted at 42. Carried by each leg 40 is a roller 54 for riding along the adjacent bottom surface of the associated leg 38. Mounted on projections 58 which extend beyond the lower ends of legs 38 are rollers 56 which ride along adjacent upper surfaces of legs 40 as shown in FIGS. 5 and 6. Rollers 54 and 56 minimize the sliding friction between legs 38 and 40.

To hold legs 38 and 40 in proper aligned position when the hitch is raised, openings 44 are formed through the sides of each upper leg 38. The end of each lower leg 40 received within upper leg 38 has an opening 46 for alignment with openings 44 of the corresponding leg 38 when legs 38 and 40 are in extended position. Locking pins 23 and 24 through aligned openings 44 and 46 lock legs 40 to legs 38 and prevent the hitch from collapsing when it is in its erect position.

To align openings 44 and 46, the end of each leg 38 has a pair of oppositely disposed V-shaped lugs 52 on the inner side walls of the legs. The end of each leg 40 received within a leg 38 has lug portions 48 extending laterally thereof and formed with V-shaped slots 50. Each V-shaped slot 50 is shaped to conform with an aligned lug 52 extending from the side walls of leg 38.

Though lug 52 is shown in FIG. 6 aligned with V-shaped slot 50, it is to be understood that lugs 52 would normally be tilted or canted slightly relative to slots 50 while the hitch is being raised. This is a result of sagging between rollers 54 and 56 from the dead weight of legs 38 and 40 as the hitch is being moved to erect position. Once the pointed ends of lugs 52 contact inclined surfaces defined by V-shaped slots 50, further movement of lugs 52 into the V-shaped slots 50 cam lugs 52 and slots 50 together resulting in a rigid alignment of the upper and lower legs 38 and 40 and an alignment of openings 44 and 46. Legs 38 and 40 are held in extended position by locking pins 23 and 24 fitted within aligned openings 44 and 46. Lugs 52 and V-shaped slots 50 additionally function to resist the tendency of legs 38 and 40 to pivot about pins 23 and 24.

Fifth wheel structure or plate 18 is similar to that shown in the above mentioned patent and may be essentially the same as that of my aforementioned application. It includes an upper trailer supporting plate 60 having a forwardly directed opening (not shown) for receiving the kingpin. The fifth wheel plate 18 also includes complementary facing locking jaws adapted to engage and hold the kingpin of trailer T when the hitch is raised, and to release the kingpin when the lower end of lever 62 is moved backward by pusher rod 36, as fully disclosed in said patent and application.

Figure 8:
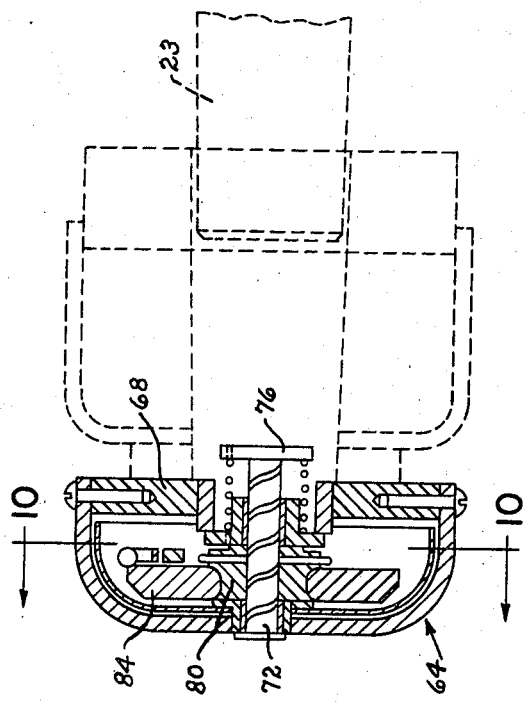
FIG. 7 and 8 are sectional views of the audible signal device in two operational conditions.
Figure 7:
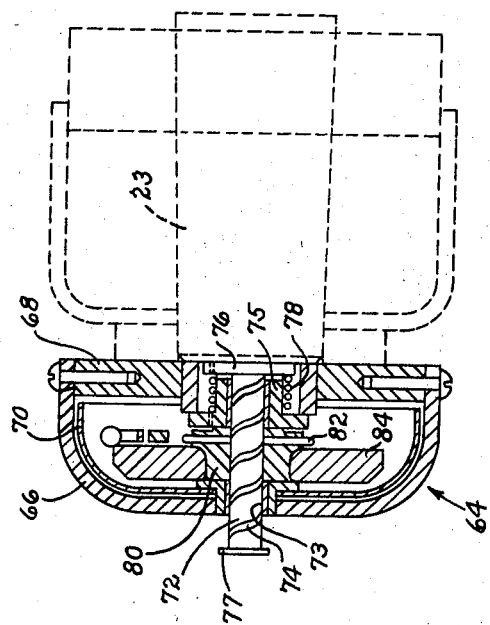

An audible signal device 64 in the form of a bell is mounted on the side of diagonal leg 14 by a bracket 66 fixed to plate 68. Signaldevice 64 includes a bell cup 70 and a shiftable shaft 72 having spiral grooves 74 and mounted in bearings 73 and 75. Shaft 72 has at its inner end a cap plate 76 against which spring 78 acts to hold shaft 72 in the retracted position shown in FIG. 8, and has a collar 77 at its outer end. A hub 80 having spokes 82 is coupled to the spiral groove of shaft 72 and a fly weight or flywheel 84 is rotatably mounted relative to shaft 72. Pawl 86 is pivoted on flywheel 84 at point 88 and the other end of the pawl is connected to one end of spring 90, while its other end 92 is fixed to flywheel 84. Pawl 86 carries a hammer 94 adapted to strike the bell. Shaft 72 may be prevented from rotating by any suitable means, such as anchoring the ends of spring 78 in elements 75 and 76.

Figure 11:
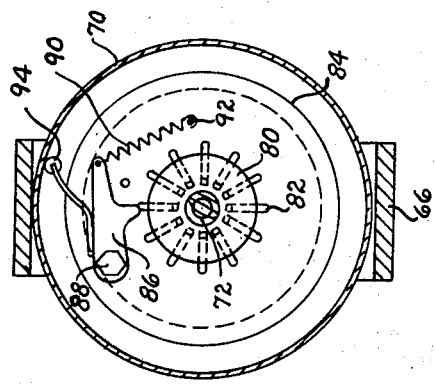
FIG. 11 is a similar view showing the signaling device in another operating position.
Figure 10:
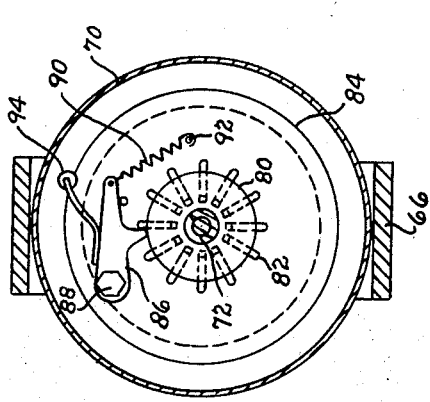
FIG. 10 is a view taken along line 10—10 of FIG. 8
Figure 9:
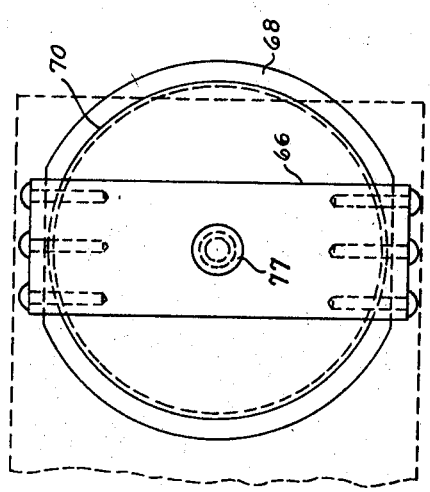
FIG. 9 is a side view of the signal device.

The operation of signal device 64 is as follows. The tractor M which moves trailer T onto the car F, drops a hook H to engage an element 96 on vertical leg 12, and the tractor then moves forwardly and thus pulls up the hitch from its collapsed position, as is well known. As the hitch approaches its erect position, the fifth wheel 18 slides under the trailer and the trailer kingpin enters the fifth wheel plate 18 and is eventually latched thereby, as is fully shown and described in my Patent No. 3,225,707. As this occurs, diagonal leg 14 becomes fully extended and openings 44 and 46 become aligned. Spring 34 then moves rod 32 upward and turns crank 30 and pinion 28. Racks 25 and 26 therefore move outwardly, and pins 23 and 24 move through openings 44 and 46. One of these pins, say 23, engages head 76 of grooved shaft 72 and forces it outwardly against the action of spring 78. Since hub 80 is coupled to spiral grooves 74, as by the extension of one or more spokes 82 into the grooves, hub 80 is rotated when shaft 72 moves axially. The rotation is counter-clockwise as seen in FIGS. 10 and 11. The engagement of spokes 82 with pawl 86 causes a like rotation of pawl 86 and flywheel 84. Hub 80 has a limited rotation corresponding to the shift of shaft 72, but the inertia of flywheel 84 causes it to continue to rotate in a counter-clockwise direction. As the flywheel rotates relative to hub 80, it carries pawl 86 over spokes 82, as shown in FIG. 11 to cause hammer 94 to strike bell 70, and the pawl is then pulled inwardly by spring 90. The bell may ring several times as pawl 86 rides over several spokes 82, before flywheel 84 stops. The number of rings of the bell is determined by the mass of flywheel 84, spring 70, and other structural elements, and not by operational factors such as the speed of hitch pull-up, so that a distinctive normal ringing is produced. The distinctive ringing of the bell will indicate to the tractor driver that the hitch has been raised and latched.

Figure 1:
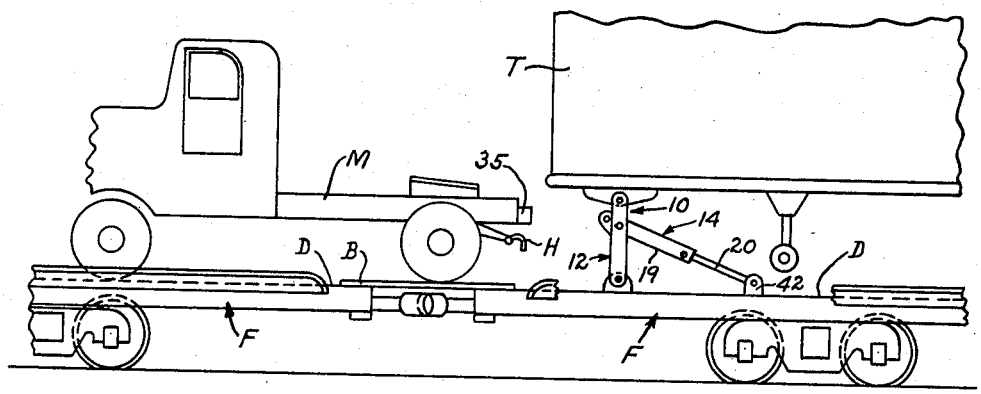
FIG. 1 is a partial elevational view of a highway trailer having its front end supported by a collapsible hitch on a railway flat car, with a tractor adapted to actuate the hitch.
Figure 3:
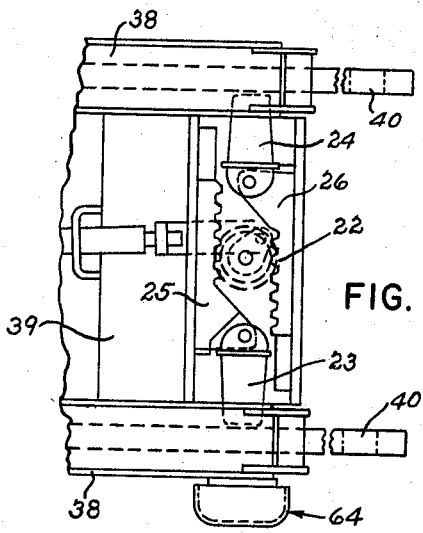
FIG. 3 is a plan view of the latching means of the diagonal leg in the unlocked position.
Figure 2:
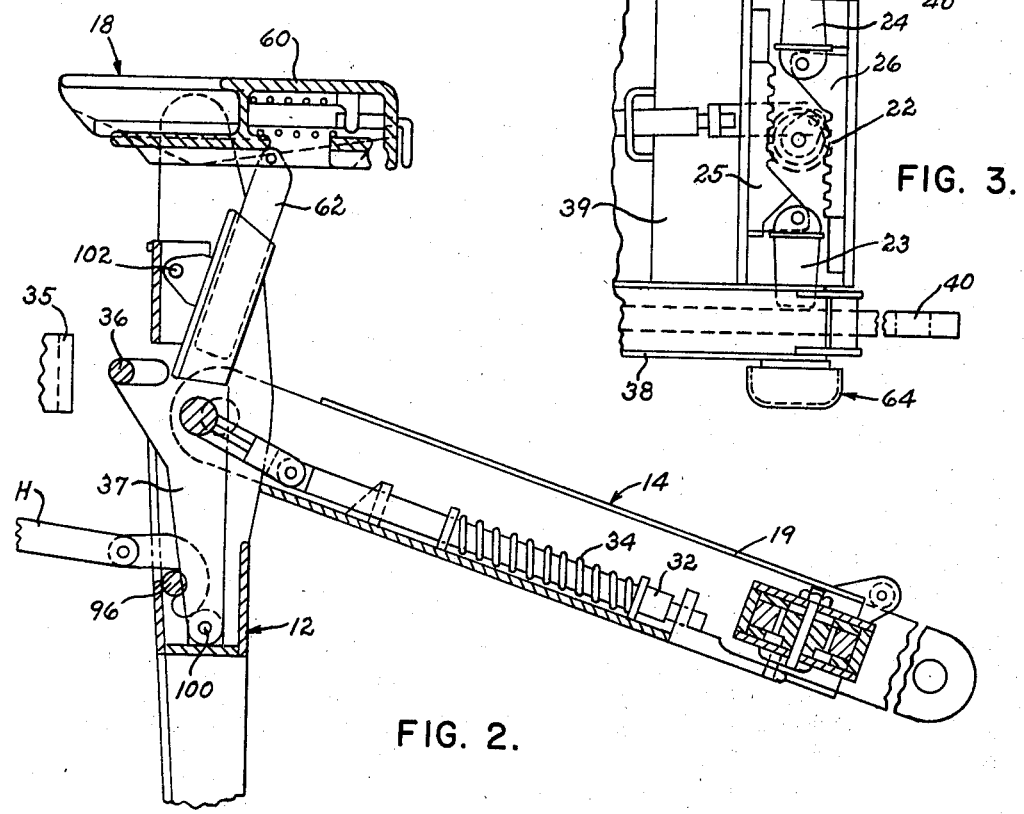
FIG. 2 is a partial elevational view of the upper portion of the hitch in its raised position with parts broken away.

To remove the trailer from the car, pusher bar 36 is impacted by the rear bumper 35 of a tractor. This turns lever 37 about pivot 100 and moves the lower end of lever 62 about pivot 102 to unlatch the trailer kingpin, as disclosed in Patent 3,225,707 and my application Ser. No. 561,613, now abandoned. The rearward movement of lever 37 causes rod 32 to move downwardly to retract pins 23 and 24 and thus unlatch diagonal leg 14 and permit sections 19 and 20 thereof to telescope. As the tractor pushes the hitch, the hitch pivots backwardly and downwardly into its collapsed position. The elements then assume the positions shown in FIGS. 3 and 8.

I claim:
1. In a collapsible hitch adapted to be mounted on the deck of a railway car for securing a trailer for transit, a generally vertical leg mounted for movement between a collapsed position and an erect position, a fifth wheel mounting plate connected to the upper end of said vertical leg, a diagonal leg pivotally connected at its upper end to said vertical leg and at its lower end to the car, one of said legs having latch means movable into locked position for locking said hitch in erect trailer-supporting position; the improvement comprising an audible signal means such as a bell mounted on the hitch for emitting a distinct signal in response to the locking of the hitch in erect position.

2. A hitch according to claim 1, wherein said latching means is located on said diagonal leg to lock the diagonal leg in response to its reaching its fully raised position, whereby the audible signal means are actuated when the diagonal leg is locked in its raised position.

3. A hitch according to claim 2, wherein said audible signal means includes a flywheel, means responsive to said latching means for imparting a rotation of said flywheel, and means responsive to rotation of said flywheel for producing an audible signal.

4. A hitch according to claim 3, wherein said audible signal means includes an axially movable non-rotatable shaft having a spiral groove therein, and means for coupling said flywheel to said spiral groove for rotating the flywheel in response to axial movement of said shaft.

5. A hitch according to claim 2, wherein the diagonal leg includes upper and lower portions having overlapping ends and being movable relative to each other for extending and contracting said diagonal leg, said latching means having a movable member located at said overlapping ends for interlocking the same when said diagonal leg is extended, said audible signal means being responsive to said movable member only upon a locking movement thereof.

References Cited
UNITED STATES PATENTS 3,050,320   8/1962   Clejan _____ 105—368 X
3,168,878   2/1965   Clejan _____ 105—368

DRAYTON E. HOFFMAN, Primary Examiner.

U.S. Cl. X.R.

248—119